United States Patent [19]

Silveri

[11] Patent Number: 4,992,156
[45] Date of Patent: Feb. 12, 1991

[54] ELECTROLYTIC POOL PURIFIER

[76] Inventor: Michael A. Silveri, 7955 Haskell Ave., #23, Van Nuys, Calif. 91406

[21] Appl. No.: 424,305
[22] PCT Filed: Mar. 6, 1989
[86] PCT No.: PCT/US89/00853
§ 371 Date: Aug. 18, 1989
§ 102(e) Date: Aug. 18, 1989

[51] Int. Cl.[5] .......................... C25B 1/06; C25B 9/00; C25B 11/04
[52] U.S. Cl. .................................... 204/228; 204/237; 204/268; 204/269; 204/270; 204/290 R; 204/291; 204/292; 204/293; 204/294
[58] Field of Search .................. 204/270, 228, 271, 95, 204/294, 292, 237, 268, 269, 290 R, 291, 293

[56] References Cited

U.S. PATENT DOCUMENTS

| | | | |
|---|---|---|---|
| 3,222,269 | 12/1965 | Stanton | 204/270 |
| 3,458,414 | 7/1969 | Crane et al. | 204/278 X |
| 4,100,052 | 7/1978 | Stillman | 204/269 X |
| 4,255,246 | 3/1981 | Davis et al. | 204/95 X |
| 4,363,713 | 12/1982 | Bindon | 204/278 |
| 4,419,207 | 12/1983 | Bindon | 204/278 X |
| 4,422,919 | 12/1983 | Fabian et al. | 204/270 |
| 4,525,253 | 6/1985 | Hayes et al. | 204/271 X |
| 4,565,617 | 1/1986 | Ahuja | 204/270 X |
| 4,790,923 | 12/1988 | Stillman | 204/269 X |

Primary Examiner—Donald R. Valentine
Attorney, Agent, or Firm—Albert O. Cota

[57] ABSTRACT

A submerged pool purifier which has a cell including an immersed enclosure (20) to which a number of electrodes (28) are disposed in parallel array along with a masking grid (29) on each electrode. Wires (30) are routed inside existing pool piping connected to opposed electrodes on one end and a power supply (58) to the other. The wires immerge from the pool piping at a convenient location and the egress is interfaced with a compression fitting (36) making the connection watertight. The power supply changes AC electrical power to DC and a polarity reversing timer (60) reverses the polarity at regular intervals to the cell eliminating scale deposits. The DC current to the electrodes that are submerged in pool water containing dilute halite salt cause an electrolytic action ultimately producing nascent oxygen and sodium hypochlorite. In a second embodiment, the electrodes utilize a copper-silver alloy creating copper and silver ions for pool purification.

23 Claims, 3 Drawing Sheets

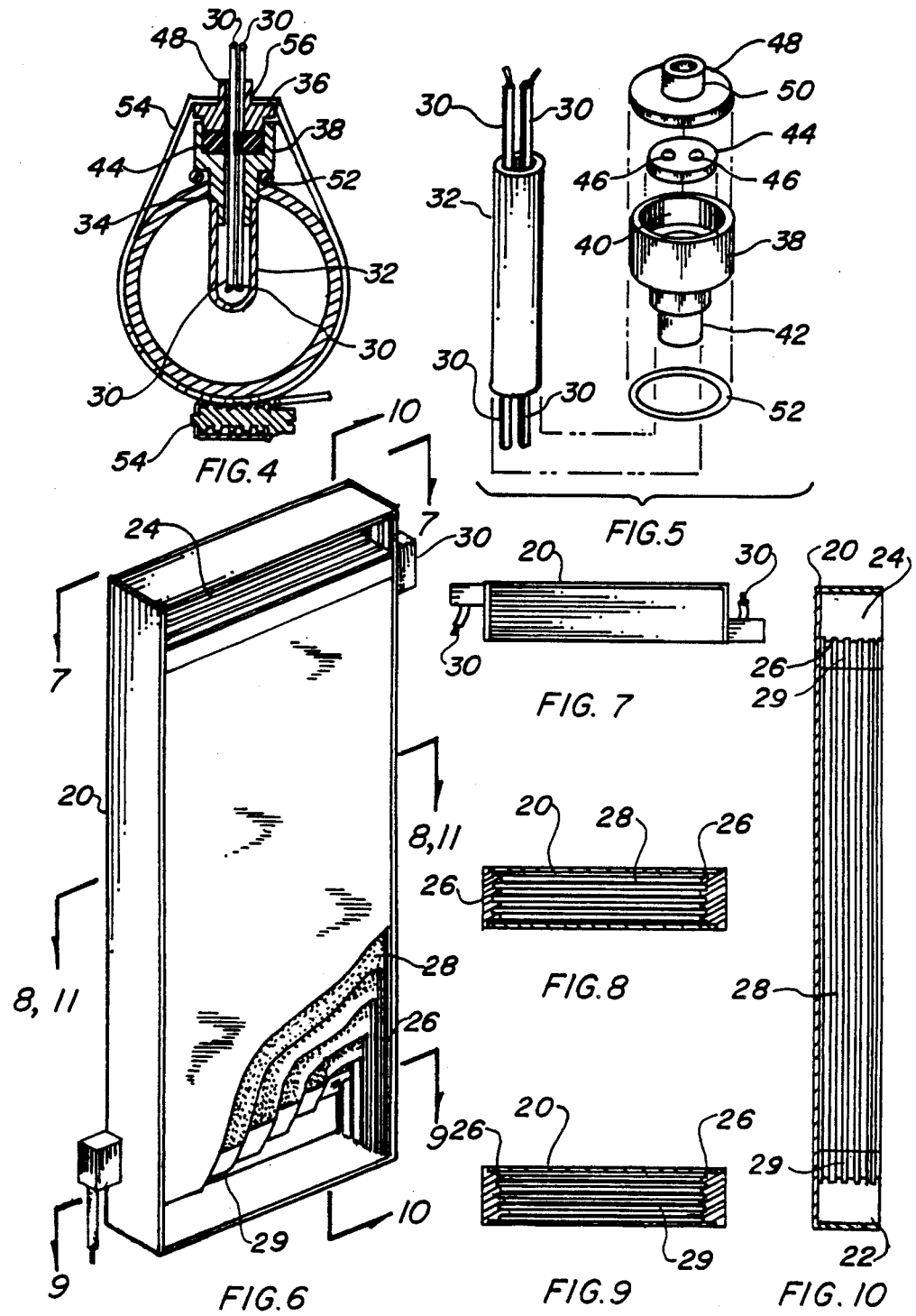

1

ELECTROLYTIC POOL PURIFIER

TECHNICAL FIELD

The present invention relates to swimming pool water purifiers in general. More specifically to apparatus utilizing a pipe in a pool water circulation system in conjunction with a polarity reversing electrolytic cell.

BACKGROUND ART

The art of producing a PH neutral sanitizer in the form of sodium hypochlororite by the use of a diluted solution of sodium chloride in conjunction with a electrolytic cell is well known in the art. Also, similarly silver and copper ions for aligodynamic sterilization has been in existence for sometime. In most cases, this electrolytic equipment is located out of the pool within the piping requiring continuous pump operation or floating on top of the pool limiting its operating life as batteries are required for the power source. Since many restrictions apply and costs of installation are high, no great popularity has been achieved by the public for this type of pool purifier.

A search of the prior art did not disclose any patents that read directly on the claims of the instant invention however, the following U.S. patents were considered related:

| PATENT NO. | INVENTOR | ISSUED |
| --- | --- | --- |
| 4,790,923 | Stillman | 13 December 1988 |
| 4,472,256 | Hilbig | 18 September 1984 |
| 4,337,136 | Dalhgren | 29 June 1982 |
| 4,193,858 | King | 18 March 1980 |
| 4,100,052 | Stillman | 11 July 1978 |
| 3,835,020 | Galneder | 10 September 1974 |
| 3,766,045 | Itakura, etal | 16 October 1973 |
| 3,669,857 | Kirkham, etal | 13 June 1972 |
| 3,305,472 | Oldershaw, etal | 21 February 1967 |

Stillman in '923 teaches an electrolytic cell installed in the water outlet pipe through which less than the entire flow of water is directed. Stillman utilizes electrical conductive bars embedded in a cell body serving as terminals. To minimize leakage, Stillman either shortens the terminal electrode; uses an insulative cap; or uses a combination of both. The cell is made such that the edging electrode plates are partially encased in an insulative chemical or the terminal electrodes are shortened to prevent current leakage between plates. This method of construction reduces the active surface area on the terminal electrodes, thus increasing the current density. Higher current density adversely affects electrode life with virtually all electrode materials. This is especially important on the terminal electrodes of a bipolar cell.

Dahlegren approaches the problem of purification using silver and copper ions using a pair of electrodes formed of silver-copper alloy extending from a floating container. A battery provides the electrical energy through a timer switch reversing the current as required to reduce erosion of one or the other electrodes. No modification to an existing pool is required.

Stillman in '052 installs an electrolytic cell in the piping of a fluid system to generate halogen directly from a solution containing a very low salt concentration allowing placement in existing as well as new facilities. The cell includes planar electrode plates attached parallel across the entire cross sectional area of an enclosure. The cell operation requires constant flow of fluid to p event the buildup of hydrogen gas.

Galneder again introduces a flow-through electrolysis chamber. The chamber contains two baffle plates with the electodes mounted therebetween. The electrodes are made of graphite and include an automatic self-adjuster spacer system securing constant maintenance of the initial cell voltage.

Itakura, et al disclose an electrolytic cell for direct electrolysis of sea water to produce hypochlorous acid, hypochlorite or chlorine. Again, the flow of water is through the entire cell. The cathode plates project from a feeding chamber into a electrolyte-exhausting chamber and through a electrolysis chamber such that they act as a funnel making the stream of sea water rise smoothly such that impurities do not adhere on the electrodes.

For background purposes and as indicative of the art to which the invention relates, reference may be made to the following remaining patents found in the search issued to Hilbig, King Kirkham etal and Oldershaw et al.

DISCLOSURE OF THE INVENTION

Prior art has already developed the process of purification of a swimming pool using electrolysis, however, a major problem with placing a cell in the piping for the pool circulation is the fact that the pump must operate continuously in order to maintain proper level of chlorine or oligodynamic ions. In large commercial or educational sponsored pools, this may not be a problem however, in residential pools the cost of continued operation becomes extremely important. With this in mind, it is a primary object of the invention to locate the electrolylic cell in a position independent of pump operation actually immersed into the water of the pool itself. A location, under the surface attached to a vertical wall, accomplishes this object without interfering with existing apparatus such as pool cleaners, skimmers, covers and the like that may be in present use in the pool. The configuration of the cell not only blends into the sidewall of the pool as it is relatively small, but creates its own water flow path through the cell by having an inlet in the bottom and outlet in the top.

In operation, the purifier is energized by a DC power source flowing between electrodes causing the salinized pool water to separate among other things, into its basic elements of hydrogen and oxygen. This electrolysis creates bubbles of the escaping elements in the form of a gas. With the bubbles seeking the surface of the pool due to their reduced specific weight, water is carried along creating a natural and continuous flow of water any time the electrodes are energized. The invention therefore, not only eliminates pump operation but the danger of explosion due to hydrogen entrapment within the cell as a natural flowpath exists. Installation costs to existing pools is not to be overlooked as the initial expense of this modification may be considerable for the homeowner.

In the invention, the cell is located submerged in the water, therefore a practical method must be employed to provide power to the cell without major modification to the pool. It is therefore, an important object of the invention to utilize the existing piping by locating the cell near the suction or return line from the pool circulating system and introduce a pair of wires through the pipe exiting at an accessible location outside the pool. This modification is easily accomplished by drilling a small hole in the pipe at a convenient location on the surface near the circulating equipment downstream of the pump and brining the wires through the hole making the joint watertight by the use of egress means in the form of a compression type fitting. As low voltage is used for the electrolytic process, a pair of wires as small as American Wire Gauge (AWG) Number 18 may be used which has a cross sectional area slender enough as to not effect the flow of water in the pipe.

Another object of the invention is directed to the use of low voltage DC power, actually below 20 volts, which is not harmful to the occupants of the pool, and, by building code, is allowed to be run without protective conduit or mechanical sheathing making the installation extremely easy and convenient.

Still another object of the invention provides considerable energy savings over in line chlorinators as discussed above, which can be as much as 50-percent of the total cost particularly during the winter season when the pool is seldom used but must retain a proper level of purification.

Yet another object of the invention achieves an extended life of the cell due to the periodic reversing of the polarity removing the buildup of scale on the electrodes. With this invention it is anticipated that the useful cell life will be up to 4-6 years and much more for the power supply and no maintenance will be required during normal operation making the entire system completely automatic requiring only a constant power source for complete operation.

Another object of the invention allows multiple cells to be used in large commercial pools and olympic size facilities commonly used by schools and sports facilities. The replacement of a larger power supply is all that is necessary for a larger number of cells according to the demands of the pool size.

A final object is the placement of the terminals on the electrodes. Since titanium is electrically very resistive, by locating the electrodes at opposite sides and ends the current is distributed evenly over the electrodes surface increasing the efficiency and life of the cell.

These and other object and advantages of the present invention will become apparent from the subsequent detailed description of the preferred embodiment and the claims taken in conjunction with the accompanying drawings.

BRIEF DESCRIPTION OF THE DRAWINGS

FIG. 4 is a cross-sectional view taken along lines 4—4 of FIG. 2 at the center of the fitting.

FIG. 5 is an exploded view of the wire egress compression fitting.

FIG. 6 is a partial isometric view of the electrolytic cell removed from the pool wall for clarity.

FIG. 7 is a cross-sectional view taken along lines 7—7 of FIG. 6 illustrating the top partially cut away.

FIG. 8 is a cross-sectional view taken along lines 8—8 of FIG. 6 illustrating the middle of the cell.

FIG. 9 is a cross-sectional view taken along lines 9—9 of FIG. 6 illustrating the bottom portion with the masking grid attached to the electrode plate.

FIG. 10 is a cross-section view taken along lines 10—10 of FIG. 6 illustrating the middle of the cell on the longitudinal centerline.

FIG. 11 is a cross section view taken along lines 11—11 of FIG. 6 illustrating the bus connecting the electrodes in the monopolar embodiment.

FIG. 12 is a partial isometric view of the cell including a housing.

FIG. 13 is a partial view of the third embodiment in new construction pools using a dedicated pipe and a nitch in the pool well for installation of the cell.

BEST MODE FOR CARRYING OUT THE INVENTION

Figure 1:
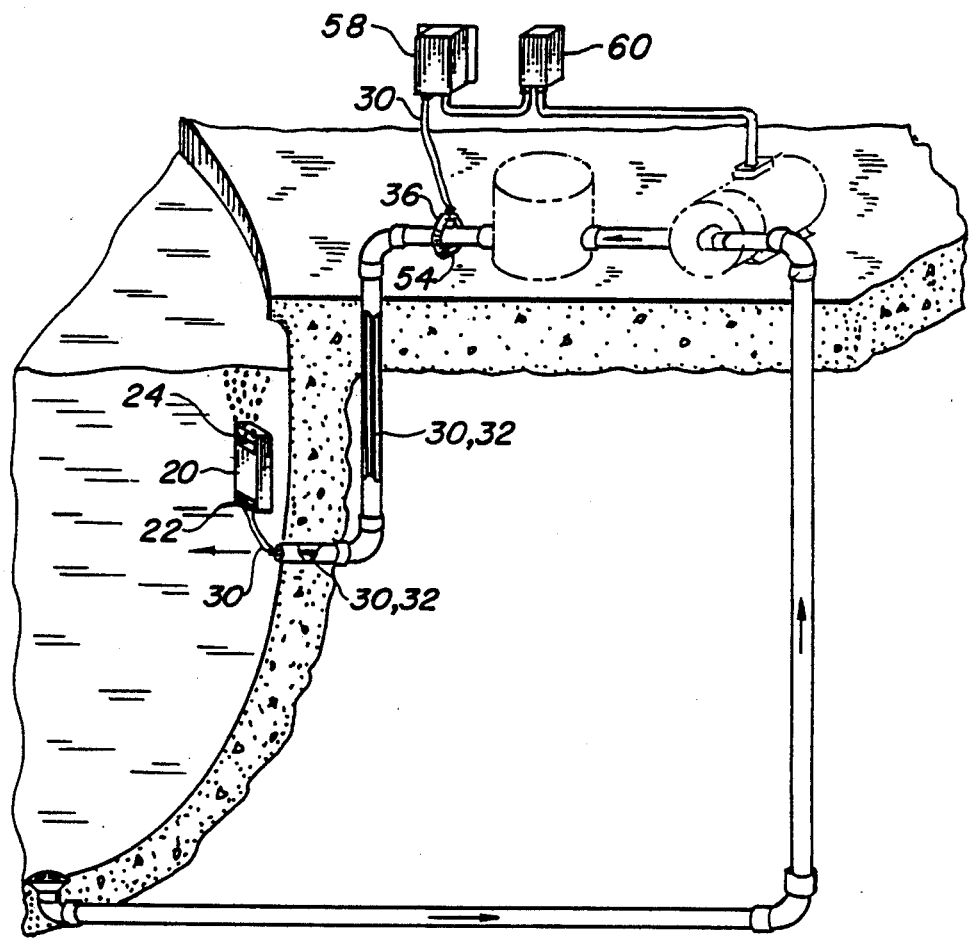
FIG. 1 is a pictorial schematic of the system illustrating the pool and decking in cross-section and the elements in partial isometric. The existing pumping system is shown in phantom.
Figure 2:
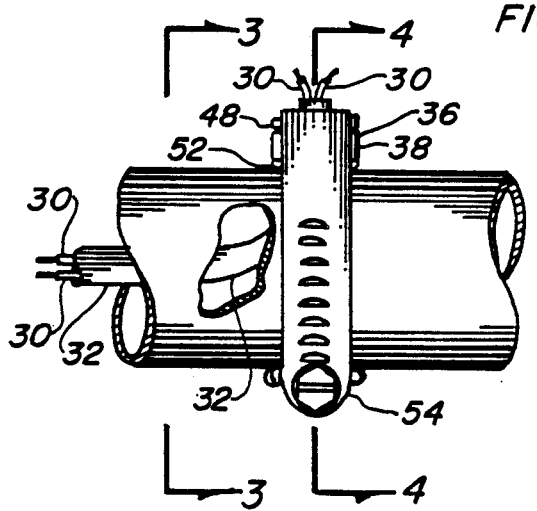
FIG. 2 is a partial view of the wire egress means using the compression type fitting with the wires illustrated inside the pipe.
Figure 3:
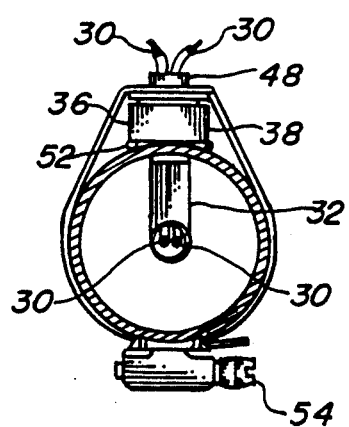
FIG. 3 is a cross-sectional view taken along lines 3—3 of FIG. 2 illustrating the inside of the pipe and side view of the compression fitting.

The best mode for carrying out the invention is presented in terms of a preferred, a second embodiment and a third embodiment. All embodiments are primarily designed alike with the exception of the electrode material or method of connecting the cell to the power supply. The preferred embodiment, as shown in FIGS. 1 through 10 is comprised of a pool having the presence of at least 1500 parts per million of sodium chloride minimum. The pool also includes a piped water circulation system with at least a portion of the water pipe accessible above ground for attachment and utilization of the invention. The submerged electrolytic cell consists of a dielectric enclosure 20 having a top, bottom, front, back and sides. All of the exposed sides are enclosed except for a lower portion of the front defining an inlet 22 and a mating upper portion forming an outlet 24. The sides contain a plurality of grooves 26 on the inner surfaces facing each other. The inlet 22 and outlet 24 allow a flowpath for water to circulate therethrough when the bubbles of gas generated by the electrolysis in the cell create a natural movement seeking a higher elevation bringing a flow of water along with the bubble movement. The enclosure is made preferably of a thermoplastic material such as polyproplene, polymethyl methaorylate, polyethylene with poly vinyl chloride being preferred.

A plurality of electrodes 28 are positioned within the cell enclosure 20 in the grooves 26 at a equally spaced relationship in a vertical juxtapositioned manner. The electrodes 28 are illustrated in FIGS. 6-10 and are spaced apart from 0.03 inches (0.08 CM) to 0.25 inches (0.64 CM) with 0.075 inches (0.19 CM) being preferred. The spacing is important in that the voltage required to produce the electrolytic effect is primarily dependent upon the gap between electrodes. It has been found that a space of 0.075 inches (0.19 CM), in the preferred configuration is optimum for the power supply. The electrodes 28 may be fabricated of any electrically conductive and electrocatalytically active material resistive to the electrolytic conditions of the cell. The substrate may be constructed of valve metals including aluminum, molybdenum, tungsten, vanadium, niobium, titanium, and the like. The electrodes 28 may be the above materials coated on the outside with platinum irridium, titanium oxide and ruthenium oxide or other material suitable for the application; or, the entire electrode may consist of an electrolytically active material such as carbon, graphite or a conductive ceramic.

A masking grid 29 in the form of a flat sheet of dielectric material such as thermoplastic is positioned contiguously to each electrode 28 as shown in FIGS. 9,10 protecting the electrode from accidental touching and also to prevent electrical leakage between electrodes 28.

A pair of electrical conducting wires 30 are attached on one end to each terminal electrode 28 using copper or brass lugs attached by rivets. One configuration of the wiring connection is to connect the first end of each wire to an outermost opposite electrode 28 creating a bipolar system or a second configuration utilizes a bus 31, shown in FIG. 11, that may be added connecting the edges of the electrodes 28 together on opposed edges forming a monopolar system. The terminal electrodes are only active on one side. Therefore, by being able to remove and reinsert them periodically will significantly increase the useful life of the cell.

By inserting the masking grid 29 in both ends of the cell and placing it on the end of the electrodes 28 leakage is prevented without increasing the current density on the terminal electrodes which are the first to deteriorate in actual usage.

The connections of the wires are then covered with a epoxy sealant to isolate the dissimilar metals from the water and prevent undue deterioration of the joint. The wires 30 penetrate the sides of the enclosure at a convenient location. The wires then are routed inside the piping system of the pool within either the return line from the pump or the suction line to the pump. The wires 30 are partially enclosed at least at the egress suction in a thermoplastic casing 32, such as vinyl tubing, for protection within that part of the piping system.

The wire leaves the pool piping system through egress means in the form of a drilled hole 34 and a compression fitting 36. The hole 34 in the pipe is located above the surface in an area downstream of the pump allowing the wire 30 enclosed in the casing 32 to be positioned easily with one end in the pool and the other extending outside of the piping above the water level.

One method of pulling the line through the piping is having a drag at its end such as a rag, running a flexible line, or through the drilled hole 34 until it comes out into the pool and pulling the wire 30 through. Any of a number of alternate methods may be used with equal ease.

The compression fitting 36 shown in FIGS. 2-5 consists of a hollow connector body 38 having a round cavity 40 in the upper portion and a stepped shoulder 42 on the bottom. A flat resilient disc 44 having a pair of bores 46 is located in the cavity 40 of the body 38 with the wires 30 extending through both the body 38 and bores 46. The resilient nature of the disc 44 grips both the wires 30 and the body 38 simultaneously. A hollow cap 48 is placed over the disc 44 with the wires 30 extending therethrough. This cap 48 contains a downwardly depending shoulder 50 smaller in diameter than the body cavity 40. An O-ring 52 is positioned over the body stepped shoulder 42. The fitting, with the wires inside, is placed into the drilled hole 34 with the stepped shoulder 42 penetrating the hull and the O-ring 56 contiguously with the pipe. A compression clamp 54 having an opening 56 in a centered portion is placed over the assembly with the cap shoulder 50 through the opening 56. When the clamp 54 is tightened the O-ring 52 is compressed between the body 38 and the pipe, also the disc 44 expands under the urging of the cap 48 gripping both the cavity 40 and wires 30 making the entire fitting permanently water tight.

The wires 30 are then attached to a power supply 58. This power supply 58 is also well known in the art and consists of solid state rectifiers that convert alternating current to direct current Further, a transformer is included to reduce the voltage to the optimum 12 volts or somewhere below 20 volts as desired. Any type of power supply may be utilized as many varieties are available on the market and operate with equal ease for the invention. The power supply may also be produced by a photovoltaic cell array again well known in the art. Along with, or integral to, the power supply 58 is a timer and reversing means 60 that triggers the change in polarity on the electrodes 28 preventing scale buildup and lengthening the effective life. Again, timers with relays, or other means of reversing polarity at a given time, are well known to those skilled in the art and commercially available therefore, the invention is not limited to a particular type or style.

In operation, the power supply 58 and timer 60 are connected to AC power preferably sharing the same source as the pumping system controls. One of the terminal electrodes 28 receives a flow of direct current through the wire 30 in a positive polarity and the opposite terminal electrode 28 receives a negative flow of direct current. This arrangement creates an anode on the positive electrode and a cathode on the negative electrode. The pool water contains at least 1500 parts per million sodium chloride acting as an electrolyte creating an electrolytic reaction between the electrodes. The process of electrolysis then produces hypochlorous acid and sodium hydroxide as well as nascent oxygen. When the hypochlorous acid and sodium hydroxide are not separated, they convert immediately to sodium hypochlorite, a common pool sanitizing agent; or, when used with a bromide salt as the electrolyte, a hypobromous acid is produced.

Nasacent oxygen by itself is an extremely powerful sanitizer however, it has a very short half-life while the chlorine provides a residual such that the water is always sanitary. Thus, electrolytic generation of chlorine provides the best of both worlds in a continuous and controlled fashion.

The pool water has been altered by the addition of a small amount of sodium chloride at least 1500 parts per million. While there is a very slight taste perception human tears are 6,500 parts per million of salt and the ocean is 35,000 by comparison, therefore, no discomfort by occupants of the swimming pool is noticed. The same effect may be achieved by the use of sodium bromide or other halide salt compound or combination thereof in place of sodium chloride as an additive to the pool water.

The second embodiment is basically the same as the preferred as far as the elements are concerned, however, the electrodes 28 are made of a copper-silver alloy, preferably containing a silver content of from 10 to 20 percent. With this material in the electrodes, the electrolysis produces copper and silver ions. The copper and silver ions are well known for oligodynamic sterilization of water particularly in swimming pools, without some of the discomforts of chlorine.

The third embodiment is exactly the same as the preferred except instead of utilizing the existing piping, a dedicatedpipe 62 is used as illustrated in FIG. 13 to route the wire 30 from the cell to the power supply 58. With this embodiment, a recessed nitch 64 may be made in the pool to contain the cell which prevents protrusion into the pool itself. Either modification to the pool or making the nitch 64 and pipe 62 at the time of construction is necessary.

While the invention has been described in complete detail and pictorially shown in the accompanying drawings it is not to be limited to such details, since many changes and modifications may be made to the invention without departing from the spirit and the scope thereof. For example, a submerged electrolytic cell pool purifier, powered by a photovoltaic cell array, can be easily scaled for use on a water fountain or the like; or the purifier may be adapted for use in any pool or body of water. Hence, it is described to cover any and all modifications and forms which may come within the language and scope of the claims.

I claim:

1. A submerged electrolytic cell pool purifier for sanitizing a pool with the pool water having halide salts and the pool including a piped water circulation system comprising:
   (a) a totally submerged dielectric enclosure having a top, bottom, front, back and sides with an inlet disposed within a lower portion, and, an outlet provided in a upper portion with said back permanently affixed to the pool under the water level providing a continual flow path for water within the enclosure and a route for the escape of gas generated within,
   (b) a plurality of electrodes spaced equally apart between the sides of said enclosure in a vertical juxtapositioned manner with the pool water freely surrounding the parallel surfaces,
   (c) a pair of electrical conducting wires, having a first and second end, disposed within a pipe of the pool water circulation system with the first end of each wire connected to a terminal electrode,
   (d) a direct current power supply connected to the second end of said wires such that one of the outermost terminal electrodes receives a flow of electricity forming respectively an anode and an cathode with the pool water acting as an electrolyte the combination producing a sanitizer for santizing the pool water, with the gas produced by the process venting through the outlet in the enclosure in the form of bubbles creating a flow of water through the cell, and
   (e) wire egress means allowing said wires to exit a connecting pipe of the swimming pool in a watertight manner permitting the purifier to be installed in existing pools independent of the pool system without undue modification thereunto.

2. The electrolytic cell pool purifier as recited in claim 1 wherein said dielectric enclosure is formed of thermoplastic with integral grooves on the sides for embracing the electrodes in a secure manner.

3. The electrolytic cell pool purifier as recited in claim 1 wherein said electrodes are covered with a catalytically active conductive coating resistant to the electrolysis conditions.

4. The electrolytic cell pool purifier as recited in claim 1 wherein said electrodes are composed entirely of a conductive ceramic compound.

5. The electrolytic cell pool purifier as recited in claim 1 wherein said electrodes are composed entirely of a graphite compound.

6. The electrolytic cell pool purifier as recited in claim 1 wherein each first end of said electrical conducting wires are connected to an outermost opposite electrode in a bipolar manner.

7. The electrolytic cell pool purifier as recited in claim 1 further comprising a bus connecting the electrodes together on opposed edges in a monopolar manner.

8. The electrolytic cell pool purifier as recited in claim 1 wherein said power supply further comprises a solid state rectifier converting alternating current to direct current limited to a 20-volt output, a timer and reversing means triggering the change in polarity preventing scale buildup on the electrodes.

9. The electrolytic cell pool purifier as recited in claim 1 wherein said direct current power supply is a photovoltaic cell array.

10. The electrolytic cell pool purifier as recited in claim 1 wherein said electrical conducting wires are partially sheathed within a thermoplastic casing for protection within the pool piping water circulation system.

11. The electrolytic cell pool purifier as recited in claim 1 wherein said terminal electrodes are removable.

12. A submerged electrolytic cell pool purifier for sanitizing a pool with the pool water having halide salts and the pool including a piped water circulation system comprising:
   (a) an immersed dielectric enclosure having a top, bottom, front, back and sides with an inlet disposed within a lower portion, and, an outlet provided in a upper portion with said back affixed to the pool under the water level providing a continual flow path for water within the enclosure and a route for the escape of gas generated within,
   (b) a plurality of electrodes spaced equally apart between the sides of said enclosure in a vertical juxtapositioned manner with the pool water freely surrounding the parallel surface,
   (c) a pair of electrical conducting wires, having a first and second end, disposed within a pipe of the pool water circulation system with the first end of each wire connected to a terminal electrode,
   (d) a direct current power supply connected to the second end of said wires such that one of the outermost terminal electrodes receives a flow of electricity forming respectively an anode and an cathode with the pool water acting as an electrolyte the combination producing a sanitizer for sanitizing the pool water, with the gas produced by the process venting through the outlet in the enclosure in the form of bubbles creating a flow of water through the cell, and
   (e) wire egress means having;
      a hollow connected body with a round cavity on one side and a stepped shoulder on the other,
      a flat resilient disc having a pair of bores therethrough urgingly compelled into the cavity of the body with the wires extending snuggly through the hollow body and bores in the disc, for gripping continguous surfaces to create a watertight seal,
      a hollow cap having a downwardly depending shoulder smaller in diameter than the cavity in the body disposed onto the cavity tightly embracing the disc with the wires extending through the hollow portion,
      an o-ring surrounding the stepped shoulder on the body defining a seal when compressed,
      said pool piped water system having a drilled hole in a pipe at a convenient location outside of the pool, the pipe having unrestricted communication to the pool interior, and a compression clamp disposed around the pipe having the hole, the body, disc and cap assembled together along with the wires penetrating the drilled hole in the pipe with the shoulder of the body within the hole and the o-ring contiguously engaging the pipe exterior surrounding the hole, the clamp creating as water tight seal as it urgingly compresses the o-ring against the pipe and body also the wires seal by the expansion of the resilient disc against the cap, body cavity and the bores containing the wires creating permanent water tight seal said wire egress means allowing said wires to exit a connecting pipe of the swimming pool in a water-tight manner permitting the purifier to be installed in existing pools independent of the pool system without undue modification thereunto.

13. A submerged electrolytic cell pool purifier for sanitizing a pool with the pool water having halide salts and the pool including a piped water circulation system comprising:
   (a) an immersed dielectric enclosure having a top, bottom, front, back and sides with an inlet disposed with a lower portion, and, an outlet provided in a upper portion with said back affixed to the pool under the water level providing a continual flow path for water within the enclosure and a route for the escape of gas generated within,
   (b) a plurality of electrodes spaced equally apart between the sides of said enclosure in a vertical juxtapositioned manner with the pool water freely surrounding the parallel surfaces,
   (c) a masking grid having a sheet of dielectric material with at least one electrode on at least one end thereof protecting each electrode from contact and preventing electrical leakage,
   (d) a pair of electrical conducting wires, having a first and second end, disposed within a pipe of the pool water circulation system with the first end of each wire connected to a terminal electrode,
   (e) a direct current power supply connected to the second end of said wires such that one of the outermost terminal electrodes receives a flow of electricity forming respectively an anode and an cathode with the pool water acting as an electrolyte the combination producing a sanitizer for sanitizing the pool water, with the gas produced by the process venting through the outlet in the enclosure in the form of bubbles creating a flow of water through the cell, and
   (f) wire egress means allowing said wires to exit a connecting pipe of the swimming pool in a water-tight manner permitting the purifier to be installed in existing pools independent of the pool system without undue modification thereunto.

14. A submerged electrolytic cell pool purifier for sanitizing a swimming pool with the pool water having the presence of at least 1500 parts per million of halide salts comprising:
   (a) an immersed dielectric enclosure having a top, bottom, front, back and sides with an inlet disposed within a lower portion and, an outlet provided in a upper portion with said back affixed to the pool under the water level providing a continual flow path for water within the enclosure and a route for the escape of gas generated within
   (b) a plurality of electrodes spaced equally apart between the sides of said enclosure in a vertical juxtapositioned manner with the pool water freely surrounding the parallel surfaces,
   (c) a masking grid having a sheet of dielectric material contiguous with each electrode on at least one side thereof protecting each electrode from contact and preventing electrical leakage,
   (d) a pair of electrical conducting wires, having a first and second end, disposed within a dedicated pipe of the pool water circulation system with the first end of each wire connected to an outermost opposite electrode, and
   (e) a direct current power supply connected to the second end of said wires such that one of the outermost electrodes receives a flow of electricity forming respectively an anode and an cathode with the pool water acting as an electrolyte the combination producing hypochlorous acid and sodium hydroxide as well as nascent oxygen for sanitizing the pool water, with the gas produced by the process venting through the outlet in the enclosure in the form of bubbles creating a flow of water through the cell.

15. The electrolytic cell pool purifier as recited in claim 14 further comprising a recessed nitch within said swimming pool to contain the dielectric enclosure and electrodes formed in such a manner as to prevent protrusion into the pool beyond a major surface.

16. A submerged electrolytic cell pool purifier for sanitizing a swimming pool including a piped water circulation system comprising:
   (a) an immersed dielectric enclosure having a top, bottom, front, back and sides with an inlet disposed within a lower portion and, an outlet provided in a upper portion with said back affixed to the pool under the water level providing a continual flow path for water within the enclosure,
   (b) a plurality of electrodes spaced equally apart between the sides of said enclosure in a vertical juxtaposition manner with the pool water freely surrounding the parallel surfaces,
   (c) a pair of electrical conducting wires, having a first and second end, disposed within a return line pipe of the pool water circulation system with the first end of each wire connected to an opposite electrode,
   (d) a direct current power supply having polarity reversing means connected to the second end of said wires such that one of the outermost electrodes receives a flow of electricity through the wire in a positive polarity and the other outermost electrode requies a negative flow of direct current electricity forming respectively an anode and an cathode with the pool water acting as electrolyte the combination producing copper and silver ions for aligodynamic sterilization of the pool water,
   (e) wire egress means allowing said wires to exit a connecting pipe of the swimming pool in a water-tight manner permitting the purifier to be installed in existing pools independent of the pool system without undue modification thereunto.

17. The electrolytic cell pool purifier as recited in claim 16 wherein said dielectric enclosure is formed of thermoplastic with integral grooves on the sides for embracing the electrodes in a secure manner.

18. The electrolytic cell pool purifier as recited in claim 17 wherein said electrodes are copper-silver alloy.

19. The electrolytic cell pool purifier as recited in claim 16 wherein said copper-silver alloy contains a silver content of a minimum of 10 percent.

20. The electrolytic cell pool purifier as recited in claim 16 wherein said power supply further comprises a solid state rectifier converting alternating current to direct current, a timer and reversing means triggering the change in polarity preventing scale buildup on the electrodes.

21. The electrolytic cell pool purifier as recited in claim 16 wherein said electrical conducting wires are partially sheathed within a thermoplastic casing for protection within the pool piping water circulation system.

22. The electrolytic cell pool purifier as recited in claim 16 wherein said wire egress means further comprises:
   (a) a hollow connector body having a round cavity on one side and a stepped shoulder on the other,
   (b) a flat resilient disc having a pair of bores therethrough urgingly compelled into the cavity of the body with the wires extending snuggly through the hollow body and bores in the disc, for gripping contiguous surfaces to create a watertight seal,
   (c) a hollow cap having a downwardly depending shoulder smaller in diameter than the cavity in the body disposed onto the cavity tightly embracing the disc with the wires extending through the hollow portion,
   (d) an o-ring surrounding the stepped shoulder on the body defining a seal when compressed,
   (e) said pool piped water system having a drilled hole in a pipe at a convenient location outside of the pool, the pipe having unrestricted communication to the pool interior, and
   (f) a compression clamp disposed around the pipe having the hole, the body, disc and cap assembled together along with the wires penetrating the drilled hole in the pipe with the shoulder of the body within the hole and the o-ring contiguously engaging the pipe exterior surrounding the hole, the clamp creating a water tight seal as it urgingly compresses the o-ring against the pipe and body also the wires seal by the expansion of the resilient disc against the cap, body cavity and the bores containing the wires creating permanent water tight egress means.

23. The electrolytic cell pool purifier as recited in claim 16 wherein said direct power supply is a photovoltaic cell array.

* * * * *

UNITED STATES PATENT AND TRADEMARK OFFICE
CERTIFICATE OF CORRECTION

PATENT NO. : 4,992,156

DATED : February 12, 1991

INVENTOR(S) : Michael A. Silveri

It is certified that error appears in the above-identified patent and that said Letters Patent is hereby corrected as shown below:

The Drawing sheet, consisting of Figs. 11, 12 and 13, should be added as shown on the attached page.

Signed and Sealed this

Ninth Day of March, 1993

Attest:

STEPHEN G. KUNIN

*Attesting Officer*  *Acting Commissioner of Patents and Trademarks*

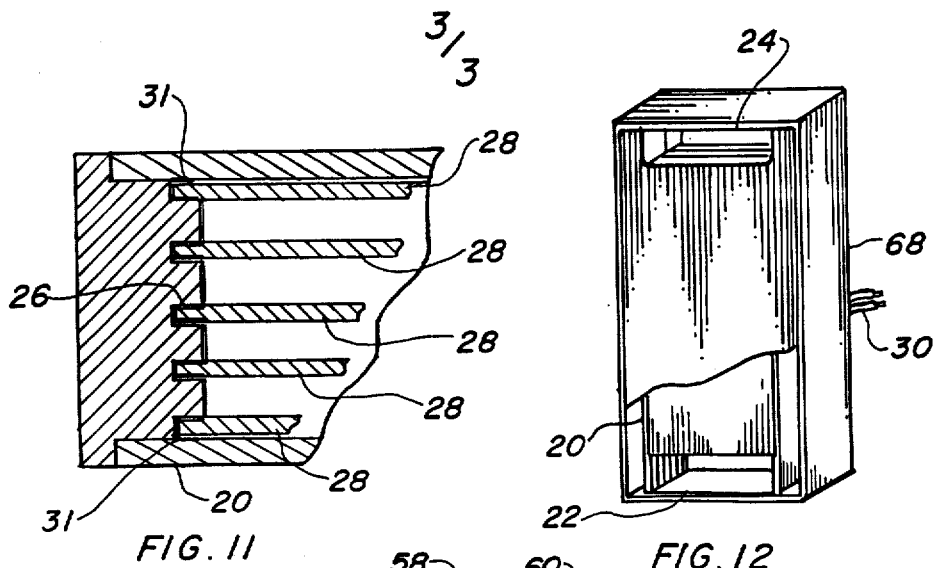
FIG. 11
FIG. 12
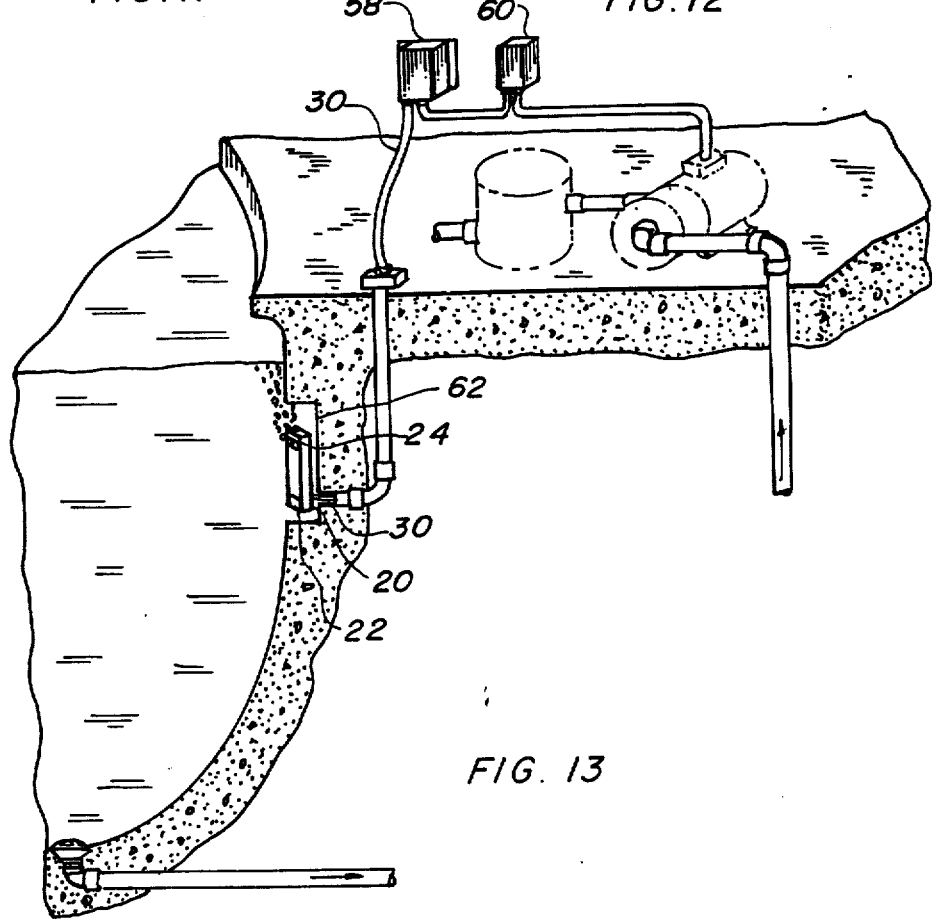
FIG. 13